(12) United States Patent
Zhu et al.

(10) Patent No.: US 11,624,868 B2
(45) Date of Patent: Apr. 11, 2023

(54) LIGHT-EMITTING DEVICE AND AUDIO DEVICE

(71) Applicant: BEIJING XIAOMI MOBILE SOFTWARE CO., LTD., Beijing (CN)

(72) Inventors: Yong Zhu, Beijing (CN); Lingyun Wen, Beijing (CN); Guang Xu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 17/710,724

(22) Filed: Mar. 31, 2022

(65) Prior Publication Data
US 2023/0039296 A1 Feb. 9, 2023

(30) Foreign Application Priority Data
Aug. 9, 2021 (CN) .......................... 202121845769.5

(51) Int. Cl.
| | |
|---|---|
| *F21V 8/00* | (2006.01) |
| *F21K 9/61* | (2016.01) |
| *F21V 5/04* | (2006.01) |
| *H04R 1/02* | (2006.01) |

(52) U.S. Cl.
CPC .............. *G02B 6/0045* (2013.01); *F21K 9/61* (2016.08); *F21V 5/046* (2013.01); *G02B 6/0091* (2013.01); *G02B 6/0095* (2013.01); *G02B 6/0073* (2013.01); *H04R 1/028* (2013.01)

(58) Field of Classification Search
CPC ......... F21V 5/046; F21K 9/61; G02B 6/0095; H04R 1/028
See application file for complete search history.

(56) References Cited

U.S. PATENT DOCUMENTS

| 9,930,444 B1 | 3/2018 | Stanley et al. |
| 2015/0172808 A1* | 6/2015 | Furuya ................... H04R 1/083 |
| | | 381/122 |
| 2021/0318486 A1 | 10/2021 | Li et al. |

FOREIGN PATENT DOCUMENTS

| CN | 107071631 A | 8/2017 |
| CN | 211853666 U | 11/2020 |
| CN | 113115159 A | 7/2021 |

OTHER PUBLICATIONS

European Patent Office, Extended European Search Report Issued in Application No. 22169113.2, dated Oct. 6, 2022, (9p).

* cited by examiner

*Primary Examiner* — Sean P Gramling
(74) *Attorney, Agent, or Firm* — Arch & Lake LLP (57) ABSTRACT

The light-emitting device includes a main body, a light-emitting module, and a press part located on the main body and configured to control on or off of the light-emitting module. The main body is provided with an accommodation space having the light-emitting module arranged therein. The main body includes a light guide, and light emitted by the light-emitting module is emitted outside of the main body through the light guide. The light guide includes a light exit surface and a light entrance surface. The light entrance surface is located on the circumferential inner sidewall of the accommodation space, and the light exit surface is located on the circumferential outer sidewall of the main body, and light emitted by the light-emitting module is emitted outside along a side of the main body.

18 Claims, 5 Drawing Sheets

LIGHT-EMITTING DEVICE AND AUDIO DEVICE

CROSS REFERENCE TO RELATED APPLICATION

The present application is based on and claims the priority to the Chinese patent application with the application number of 202121845769.5 and the filing date of Aug. 9, 2021, the entire content of which is incorporated herein by reference for all purposes.

TECHNICAL FIELD

The present disclosure relates to the technical field of audio devices, and in particular, to a light-emitting device and an audio device.

BACKGROUND

With the progress of society, people yearn for a more colorful life. Vocal music can cultivate people's sentiments, and can also add a touch of fun to a busy life and make people relax. An audio device is a device that can restore and play audio signals, which can meet people's needs for sound amplification.

Portable audio devices can be suitable for outdoor entertainment, but also for computer amplification. Portable audio devices are more popular because of small size and long playback time, loud external speakers, and no damage to the eardrum.

However, with the improvement of living standards, people not only pay attention to the audio function, but also have higher and higher requirements for its appearance. Manufacturers hope to improve the appearance of the audio device under the premise of taking into account the sound performance, so as to enhance the market competitiveness of their products. Therefore, how to take into account the sound performance and aesthetics has become an urgent problem to be solved.

SUMMARY

According to a first aspect of the present disclosure, a light-emitting device is provided. The light-emitting device includes a main body and a light-emitting module. The main body is provided with an accommodation space, and the light-emitting module is located in the accommodation space. The main body includes a light guide part, and light emitted by the light-emitting module is emitted outside of the main body through the light guide part. The light guide part includes a light exit surface and a light entrance surface. The light entrance surface is located on a circumferential inner sidewall of the accommodation space, and the light exit surface is located on a circumferential outer sidewall of the main body, so that light emitted by the light-emitting module is emitted outside along a side of the main body. The light-emitting device further includes a press part located on the main body, and the press part is configured to control on or off of the light-emitting module.

According to a second aspect of the present disclosure, there is provided an acoustic device, including the above-mentioned light-emitting device and a device body. The light-emitting device is mounted on the device body.

It is to be understood that the foregoing general description and the following detailed description are exemplary and explanatory only, and are not restrictive of the present disclosure.

BRIEF DESCRIPTION OF THE DRAWINGS

The accompanying drawings, which are incorporated in and constitute a part of the present specification, illustrate embodiments consistent with the present disclosure and together with the present description serve to explain the principle of the present disclosure.

DETAILED DESCRIPTION OF THE EMBODIMENTS

Exemplary embodiments will be described in detail herein, examples of which are illustrated in the accompanying drawings. Where the following description refers to the drawings, the same numerals in different drawings refer to the same or similar elements unless otherwise indicated. The implementations described in the following embodiments do not represent all implementations consistent with the present disclosure. Rather, they are merely examples of devices and methods consistent with some aspects of the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The present disclosure provides a light-emitting device. The light-emitting device includes a main body and a light-emitting module. The main body is provided with an accommodation space, and the light-emitting module is located in the accommodation space. The main body includes a light guide part, and light emitted by the light-emitting module is emitted outside of the main body through the light guide part. The light guide part includes a light exit surface and a light entrance surface. The light entrance surface is located on a circumferential inner sidewall of the accommodation space, and the light exit surface is located on a circumferential outer sidewall of the main body, so that light emitted by the light-emitting module is emitted outside along a side of the main body. The light-emitting device further includes a press part located on the main body, and the press part is configured to control light intensity, on, or off of the light-emitting module. In an embodiment of the present disclosure, a press part is provided to realize the human-computer interaction function, which allows operability and entertainment, and improves the user experience. At the same time, the light guide part cooperates with the light-emitting module to realize the lighting effect, which increases the visual effect and enhances the market competitiveness of the product.

Figure 1:
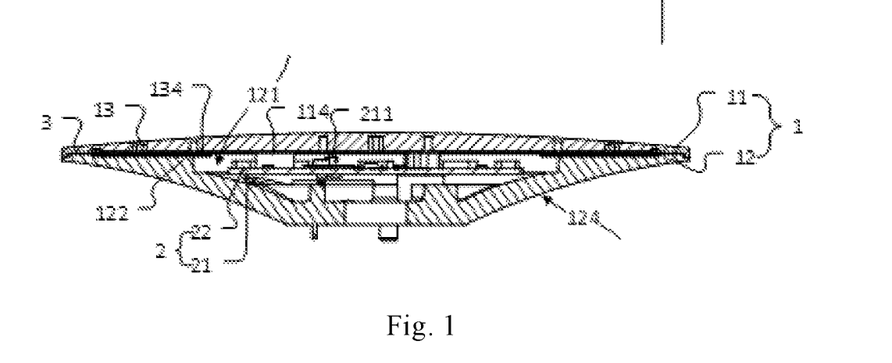
FIG. 1 is a schematic structural diagram of a light-emitting device according to one or more examples of the present disclosure.
Figure 7:
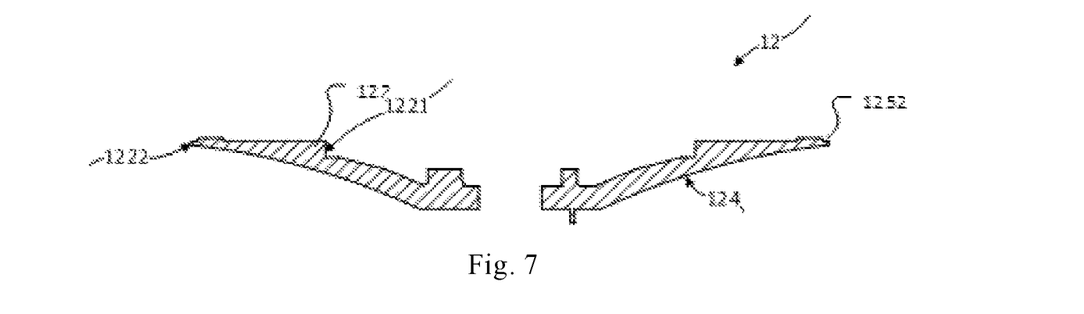
FIG. 7 is a schematic cross-sectional view of a lower cover according to one or more examples of the present disclosure.

In an embodiment, as shown in FIG. 1 and FIG. 7, a light-emitting device includes a main body 1 and a light-emitting module 2. The main body 1 is provided with an accommodation space 121, and the light-emitting module 2 serves as a light-emitting part arranged in the accommodation space 121, so as to realize the light-emitting function of the light-emitting device.

As shown in FIG. 1 and FIG. 7, the main body 1 includes a light guide part 122, and light emitted by the light-emitting module 2 is emitted outside of the main body 1 through the light guide part 122, so as to realize the lighting effect. The light guide part 122 includes a light exit surface 1221 and a light entrance surface 1222. The light entrance surface 1222 is located on a circumferential inner sidewall of the accommodation space 121, so that light emitted by the light-emitting module 2 in the accommodation space 121 is irradiated to the light entrance surface 1222 of the light guide part 122 and enters the light guide part 122 through the light entrance surface 1222. Under the effect of optical principles such as refraction and reflection, the light is led out of the light guide part 122 by the light exit surface 1221 and propagates to the outside, realizing the side light emission of the light-emitting device. This enables the light-emitting path to be scattered along the peripheral side of the light-emitting device, thereby improving the light-emitting effect of the light-emitting device and improving the user experience.

The light-emitting device further includes a press part 13 located on the main body 1. The press part 13 is configured to control on or off of the light-emitting module 2. With the press part 13, the human-computer interaction of the light-emitting device is realized, so that operability and entertainment are allowed for the light-emitting device.

Figure 10:
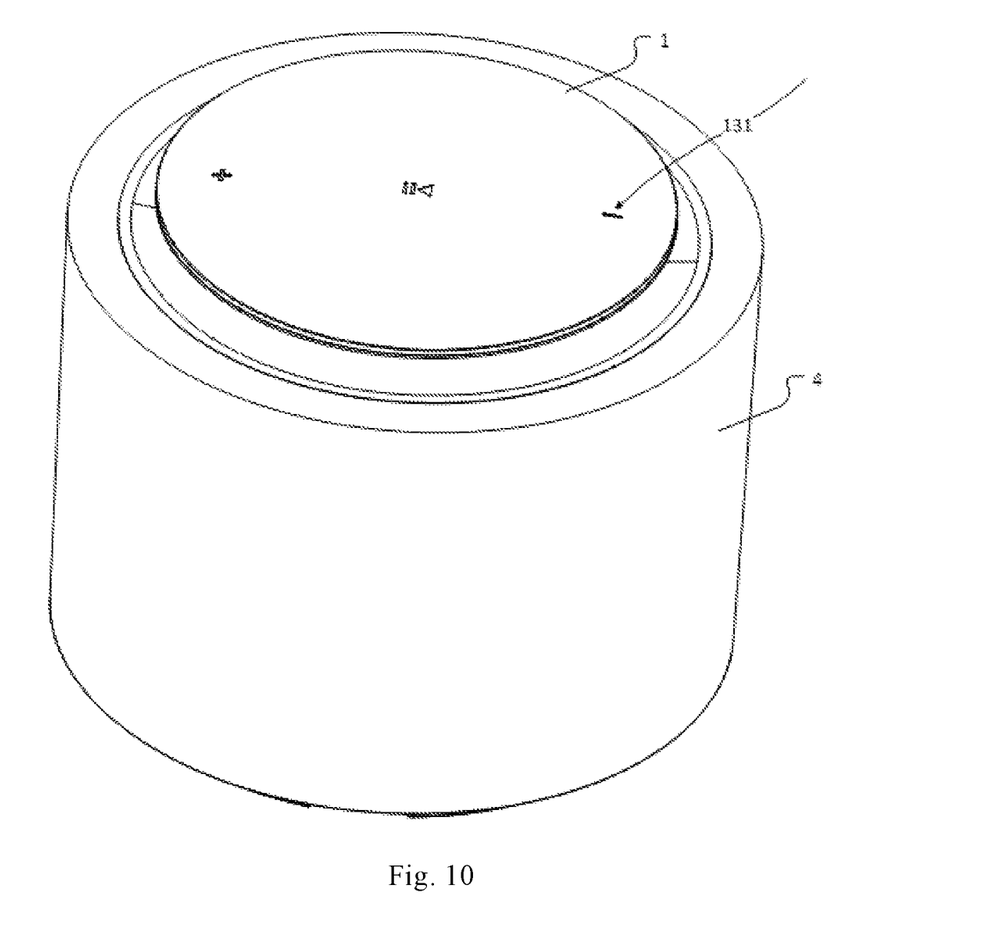
FIG. 10 is a schematic structural diagram of an audio device according to one or more examples of the present disclosure.

In an embodiment, as shown in FIGS. 1 and 10, the press part 13 includes a plurality of press regions 131. The press regions 131 are located on an axially outer sidewall of the main body 1, and the plurality of press regions 131 is arranged at intervals. This helps to avoid the press regions 131 from sticking when they are pressed by the user, which would otherwise result in problems such as short circuit or interference.

Referring to FIGS. 1, 2, 4, and 6, under the action of an external force, the press region 131 can generate an elastic deformation along an axial direction (see the Z axis shown in FIG. 1) of the main body 1. This helps to trigger the switch unit of the light-emitting module 2 to turn on or off the light-emitting module 2, thus meeting the requirements of the user. After the external force is removed, the press region 131 will return to the original position, so as to prevent the press region 131 from continuously pressing the switch unit of the light-emitting module 2, forming electrical adhesion, and causing damages to the light-emitting module 2.

Figure 4:
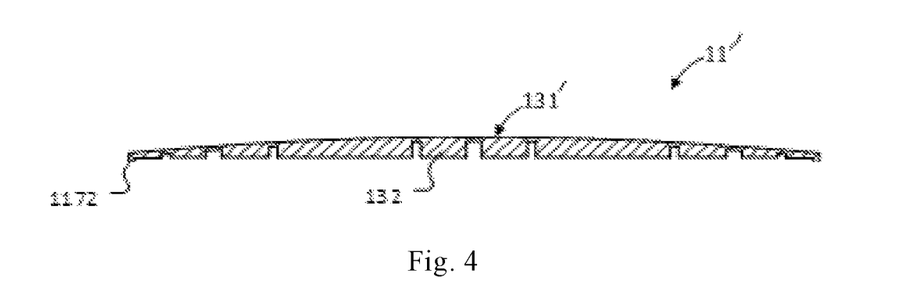
FIG. 4 is a schematic cross-sectional view of an upper cover according to one or more examples of the present disclosure.

In an example, as shown in FIGS. 1 and 4, the press part 13 includes a plurality of groups of press protrusions 132 located in the accommodation space 121. The groups of press protrusions 132 are fixedly connected to an inner top wall of the accommodation space 121. Each press region 131 corresponds to a respective group of press protrusions 132, so that the user can accurately find the target press region 131 and complete the press operation.

At least one group of press protrusions 132 includes a plurality of press protrusions, and the plurality of press protrusions is arranged around a center of the respective press region 131, so that the group of press protrusions 132 is configured as a petal-shaped structure. This helps to improve the user's press touch and allows the user to accurately know whether the press is in place.

Figure 2:
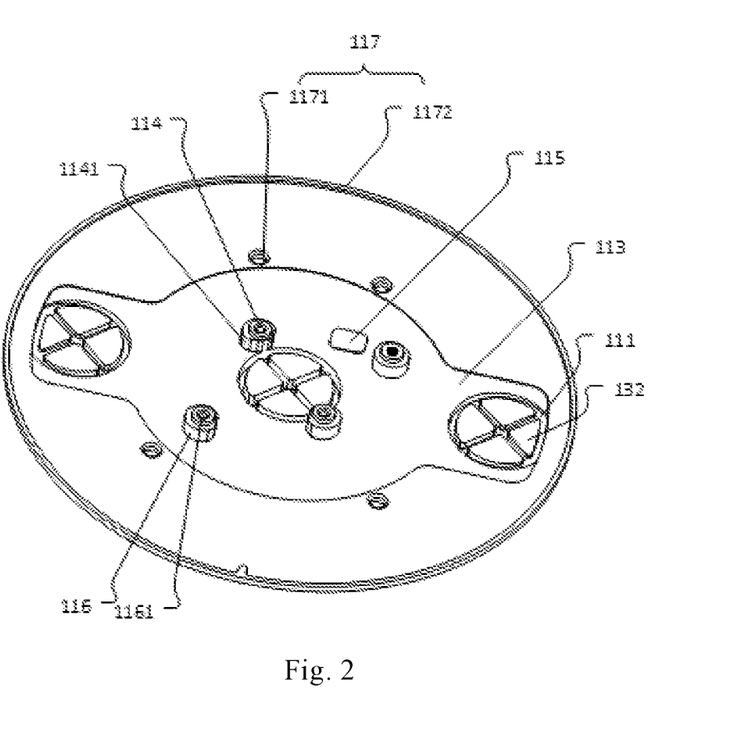
FIG. 2 is a schematic structural diagram of an upper cover according to one or more examples of the present disclosure.

In an example, as shown in FIG. 1, FIG. 2 and FIG. 4, the inner top wall of the accommodation space 121 is provided with a plurality of first mounting grooves 111. The first mounting grooves 111 are cylindrical grooves. Each group of press protrusions 132 is located in a respective first mounting groove 111. A surface of the group of press protrusions 132 is flush with the inner top wall of the accommodation space 121. Alternatively, a surface of the group of press protrusions 132 is slightly higher than a surface of the accommodation space 121, so as to ensure that the user's press action can be in place.

Figure 5:
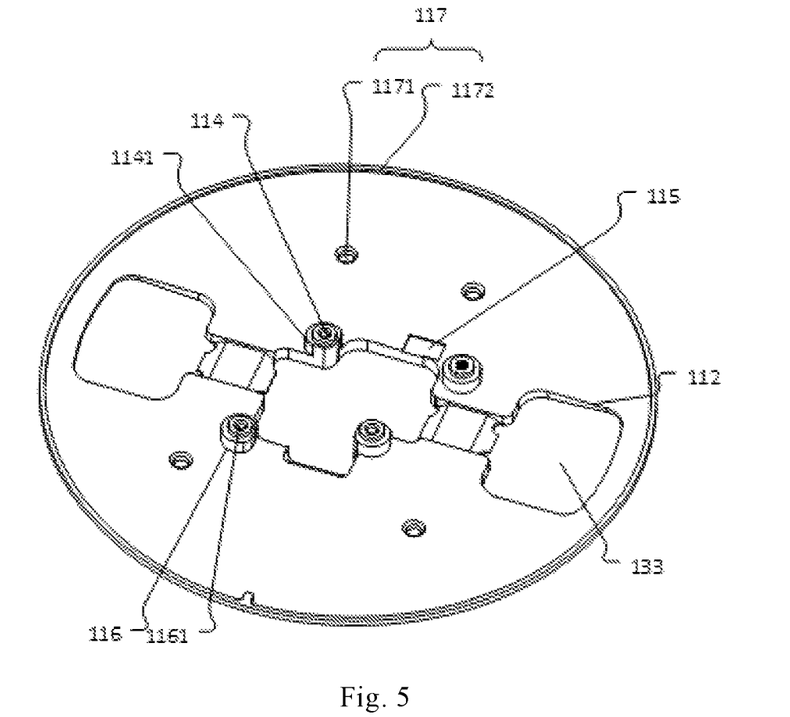
FIG. 5 is a schematic structural diagram of an upper cover according to one or more examples of the present disclosure.
Figure 6:
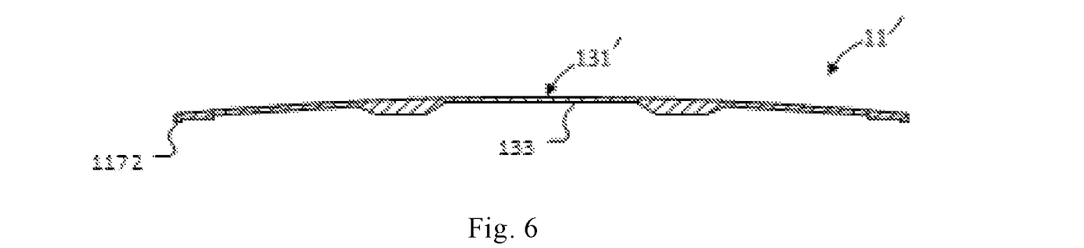
FIG. 6 is a schematic cross-sectional view of an upper cover according to one or more examples of the present disclosure.

In another example, referring to FIG. 1, FIG. 5, and FIG. 6, the press part 13 includes a plurality of arc-shaped bodies 133. The arc-shaped bodies 133 are located in the accommodation space 121. Each of the arc-shaped bodies 133 corresponds to a respective press region 131. A plurality of grooves 112 are formed on the inner top wall of the accommodation space 121, and at least one groove 112 is bent outward from a center of the groove 112 to form a respective arc-shaped body 133. The arc-shaped body 133 bulges out a surface of the main body 1. When the user exerts a force on the press region 131, the user's press feeling can be improved, and the user can determine whether the press is in place based on the deformation amount of the arc-shaped body 133.

Figure 3:
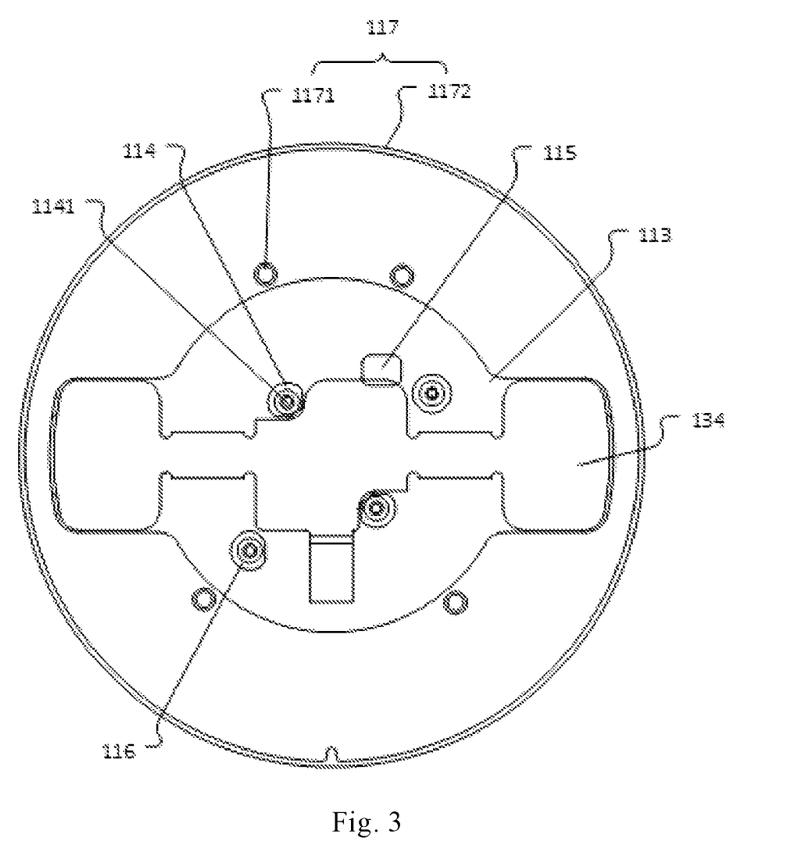
FIG. 3 is a schematic structural diagram of an upper cover according to one or more examples of the present disclosure.

In an embodiment, as shown in FIG. 1, FIG. 3, and FIG. 4, the press part 13 further includes a press circuit board 134. The press circuit board 134 is, for example, a Flexible Printed Circuit (FPC for short), so that the press circuit board 134 has characteristics such as light weight, thin thickness, and being freely bent and folded.

The press circuit board 134 is located on the inner top wall of the accommodation space 121, and the press circuit board 134 may be fixedly connected to the inner top wall of the accommodation space 121 by means of bonding, so as to improve the stability of the press circuit board 134.

For example, the inner top wall of the accommodation space 121 may be provided with a second mounting groove 113, and the size of the second mounting groove 113 is adapted to the size of the press circuit board 134. The press circuit board 134 is installed in the second mounting groove 113. The second mounting groove 113 helps to position the press circuit board 134, so as to ensure that the press circuit board 134 is installed in alignment, to improve the assembly efficiency, and to avoid misalignment causing influences on the normal use of the press circuit board 134.

The press circuit board 134 covers a plurality of press regions 131, so that at least one press region 131 may generate a press response. The press circuit board 134 is electrically connected with the light-emitting module 2 to realize the touch function of the light-emitting device. This may be adjusted at any time according to the needs of the user.

In an embodiment, as shown in FIGS. 1 and 2, the light-emitting module 2 includes a light source circuit board 21 and a plurality of light sources 22 fixedly located on the light source circuit board 21.

The light source 22 may be an LED lamp, so that the emitted light is softer and more energy-saving. The light source 22 may be fixedly connected to the light source circuit board 21 by welding.

The light source circuit board 21 may be a Printed Circuit Board Assembly (PCBA for short), which is used to support the light sources 22 and cause the light sources 22 to turn on through wires. The plurality of light sources 22 is electrically connected with the press circuit board 134 of the press part 13 through the light source circuit board 21.

In an embodiment, as shown in FIG. 1 and FIG. 2, the main body 1 further includes a mounting part 114 that is fixedly connected to the inner top wall of the accommodation space 121. The mounting part 114 includes a plurality of columnar structures, and the plurality of columnar structures is located at intervals on the inner top wall of the accommodation space 121. The light-emitting module 2 is fixedly connected to the inner top wall of the accommodation space 121 through the mounting part 114.

In an example, the main body 1 further includes a double-sided colloid (not shown in the figures), and the light-emitting module 2 is bonded and connected to the free end of the columnar structure through the double-sided colloid. This helps to ensure the integrity of the light-emitting module 2 and improve the strength of the light-emitting module 2. Besides, the bonding assembly is simple and effective, and the assembly efficiency is improved.

In another example, as shown in FIGS. 1 and 2, the free end of each columnar structure is provided with a first mounting screw hole 1141 along its axial direction, and the light source circuit board 21 is provided with a through hole (not shown in the figures). The light source circuit board 21 is screwed into the first mounting screw hole 1141 of the columnar structure through a screw, so as to achieve a detachable connection, and facilitate maintenance or replacement of the light-emitting module 2.

Figure 8:
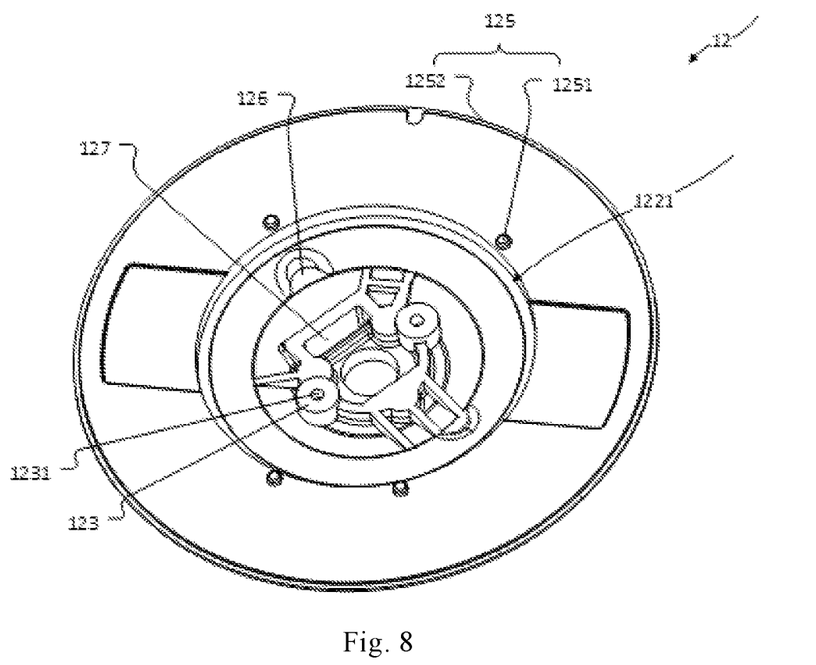
FIG. 8 is a schematic structural diagram of a lower cover according to one or more examples of the present disclosure.

With reference to FIG. 1, FIG. 2, and FIG. 8, the mounting part 114 is used to support the light-emitting module 2, so that there is a preset distance between the light-emitting module 2 and the inner top wall of the accommodation space 121. The preset distance may be for example from 3 mm to 10 mm. The light-emitting module 2 is spaced apart from the inner top wall of the accommodation space 121 to expose the light sources 22 on the light source circuit board 21. This helps to ensure the light sources 22 to work normally and meet the lighting requirements of the light-emitting device. The inner bottom wall of the accommodation space 121 is provided with an avoidance part 126, and the head of the screw may extend into the avoidance part 126. The avoidance part 126 may be, for example, a semi-annular baffle, which may be configured to surround the head of the screw and separate the head of the screw from other components.

In an embodiment, as shown in FIGS. 1 and 3, the inner top wall of the accommodation space 121 is further provided with a ground groove 115. In the assembled state, the clip 211 on the light source circuit board 21 abuts against the press circuit board 134, such that the press circuit board 134 is connected to the ground groove 115 to form a ground effect and improve the safety of the light-emitting device.

In an embodiment, as shown in FIG. 1, the main body 1 further includes an upper cover 11 and a lower cover 12. The upper cover 11 and the lower cover 12 are detachably connected.

The upper cover 11 is made of aluminum material, so as to have characteristics such as light weight and high strength. This makes it easy for the press part 13 located on the upper cover 11 to have a better press effect. Along the axial direction of the main body 1, the press region 131 is located on the upper surface of the upper cover 11, providing a force application point for the user to meet the press requirements.

In order to further improve the aesthetics and feel of the upper cover 11, the main body 1 further includes a textured structure (not shown in the figures). The textured structure is formed on a surface of the upper cover 11 away from the lower cover 12, that is, on the surface where the press region 131 is located, to increase the visual effect. The textured structure may include, for example, the texture of an optical disc, and have colorful patterns. With different viewing angles, positions of the colorful patterns also move regularly, and the colorful patterns always maintain a symmetrical pattern, so that the upper cover 11 presents different aesthetics.

The lower cover 12 is made of high-transparency plastic and is formed by injection molding. During the injection molding process, light diffusing powder may be added to enhance the spreading and diffusivity of the light sources 22, and block the point light source, making it to become an area light source. This ensures that light emitted by the light sources 22 as a whole is softer and more beautiful, and achieves the comfort effect of light transmission and opacity. Further, sufficient lighting is also ensured without being dazzling.

Referring to FIGS. 1 and 7, the light guide part 122 is formed on the upper surface of the lower cover 12 and located between the upper cover 11 and the lower cover 12. Light emitted by the light-emitting module 2 is irradiated to the light guide part 122. The light guide part 122 is, for example, an annular boss. The radially inner sidewall of the light guide part 122 is the light entrance surface 1222, and the radially outer sidewall of the light guide part 122 is the light exit surface 1221, providing a light path for the light-emitting module 2. The radially outer sidewall of the light guide part 122 forms the light exit surface 1221 by means of laser engraving, so as to improve the light exit effect.

In order to ensure that light emitted by the light-emitting module 2 propagates along the light guide part 122 and avoid overflowing from other parts, the light-emitting device further includes a light shielding layer 124. The light shielding layer 124 is located on a surface of the lower cover 12 away from the upper cover 11. The light shielding layer 124 may be a light shielding film, and the light shielding film is attached to the lower surface of the lower cover 12, so as to avoid light leakage. Alternatively, the light shielding layer 124 may also be paint, such as ink or black paint. The paint is applied onto the lower surface of the lower cover 12 to avoid light leakage.

In an embodiment, as shown in FIG. 1, FIG. 2, and FIG. 8, the accommodation space 121 is formed in the lower cover 12 so as to accommodate the light-emitting module 2. The lower surface of the upper cover 11 is configured as the inner top wall of the accommodation space 121. The upper surface of the lower cover 12 is provided with a recess part to form the accommodation space 121. The inner bottom wall of the recess part is configured as the inner bottom wall of the accommodation space 121. The upper cover 11 and the lower cover 12 are disassembled to open the accommodation space 121. The upper cover 11 and the lower cover 12 are assembled to close the accommodation space 121. The upper cover 11 and the lower cover 12 are detachably connected, to facilitate later maintenance or replacement and reduce the maintenance cost.

In an example, as shown in FIGS. 1, 2 and 8, the main body 1 further includes a first connection part 116 located on the upper cover 11, a second connection part 123 located on the lower cover 12, and a connection piece (not shown in the figures). The first connection part 116 is detachably connected with the second connection part 123 through the connection piece.

For example, the first connection part 116 may be a connection post. The connection post has a second mounting screw hole 1161. The second connection part 123 has a third mounting screw hole 1231. The connection piece passes through the third mounting screw hole 1231 and is screwed into the second mounting screw hole 1161, so as to complete the assembly between the upper cover 11 and the lower cover 12. The connection between the upper cover 11 and the lower cover 12 is made more reliable by the cooperation among the connection piece, the first connection part 116 and the second connection part 123.

In another example, as shown in FIG. 1, the light-emitting device further includes a seal part 3. The seal part 3 is, for example, a sealant. The seal part 3 is located between the upper cover 11 and the lower cover 12. The upper cover 11 bonded and connected to the lower cover 12 through the seal part 3. The seal part 3 is arranged between the upper cover 11 and the lower cover 12 to form a peripheral seal, so that the gap between the upper cover 11 and the lower cover 12 is relatively good. This also helps to seal and block the optical path, such that light emitted by the light-emitting module 2 is prevented from leaking out from the gap between the upper cover 11 and the lower cover 12.

In an embodiment, as shown in FIG. 1, FIG. 2, and FIG. 8, the main body 1 further includes a first positioning part 117 located on the upper cover 11, and a second positioning part 125 located on the lower cover 12. The first positioning part 117 and the second positioning part 125 are plug-connected to each other.

In an example, as shown in FIGS. 1, 2 and 8, the first positioning part 117 includes a plurality of positioning holes 1171, and the second positioning part 125 includes a plurality of positioning posts 1251. In the assembled state, the positioning holes 1171 and the positioning posts 1251 are in one-to-one correspondence and plug-in connection, so as to ensure the alignment in mounting between the upper cover 11 and the lower cover 12, and avoid the misalignment between the two, which would otherwise affect the mounting effect.

In another example, as shown in FIGS. 1, 2 and 8, the first positioning part 117 includes an annular protrusion 1172, and the second positioning part 125 includes an annular groove 1252. In the assembled state, the annular protrusion 1172 may be inserted into the annular groove 1252 to realize alignment in mounting and improve the assembly effect.

Figure 9:
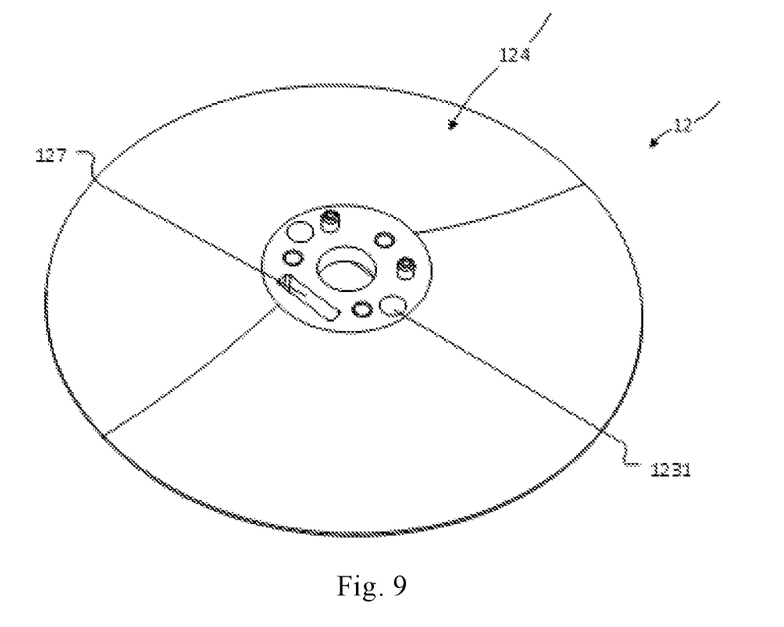
FIG. 9 is a schematic structural diagram of a lower cover according to one or more examples of the present disclosure.

As shown in FIGS. 8 to 10, an embodiment of the present disclosure may be applied to an electronic equipment that needs to emit light. The electronic equipment may be an audio device. The electronic equipment is further provided with a device body 4, and the light-emitting device is connected to the device body 4. The device body 4 is provided with a main board inside. The lower cover 12 is also provided with through holes 127. Leads of the light source circuit board 21 in the light-emitting module 2 are electrically connected to the main board through the through holes 127, so as to realize the light-emitting function of the light-emitting module 2.

The technical solutions provided by embodiments of the present disclosure may include the following beneficial effects. The press part is provided in an embodiment of the present disclosure to realize a human-computer interaction function, have operability and entertainment, and improve the user experience. At the same time, the light guide part cooperates with the light-emitting module to realize the lighting effect, which increases the visual effect and enhances the market competitiveness of the product.

An embodiment of the present disclosure also provides an audio device, including the light-emitting device in any of the above embodiments and a device body. The light-emitting device is installed on the upper part of the device body and serves as an upper cover of the device body.

The press part in the light-emitting device may be combined with the volume keys to achieve the effect of combining touch control and side lighting. For example, the volume keys include an increase key, a decrease key, and a pause key/play key. The press region includes a first press region, a second press region, and a third press region, which are respectively related to the increase key, the decrease key, and the pause key/play key. The user may press the target region as needed to realize the action of human-computer interaction, which improves the operability and entertainment of the audio device.

While adjusting the volume, a lighting effect may be provided to make the surround of the audio device glow, which increases the visual effect, and makes the product more attractive. During use, the user presses the target press region to cause a slight deformation under the force. This triggers the press circuit board to respond to the deformation position, and change the volume and lighting effect status, thus realizing the adjustment.

In some embodiments of the present disclosure, the press part includes a plurality of press regions, located at intervals on an axial outer sidewall of the main body.

The press regions are configured to generate an elastic deformation along an axial direction of the main body under an action of an external force.

In some embodiments of the present disclosure, the press part includes a plurality groups of press protrusions, located in the accommodation space, and fixedly connected to an inner top wall of the accommodation space. Each press region corresponds to a respective group of press protrusions.

At least one group of press protrusions includes a plurality of press protrusions, located around a center position of a respective press region, so that the group of press protrusions is configured as a petal-shaped structure.

In some embodiments of the present disclosure, an inner top wall of the accommodation space is provided with a plurality of first mounting grooves, and each group of press protrusions is located in a respective first mounting groove.

In some embodiments of the present disclosure, the press part includes a plurality of arc-shaped bodies located in the accommodation space, and each of the arc-shaped bodies corresponds to a respective press region.

An inner top wall of the accommodation space is formed with a plurality of grooves, and at least one groove is bent towards outside from a center position of the groove to form a respective arc-shaped body.

In some embodiments of the present disclosure, the press part further includes a press circuit board, located on an inner top wall of the accommodation space. The press circuit board covers the plurality of press regions, and is electrically connected with the light-emitting module.

In some embodiments of the present disclosure, the light-emitting module includes a light source circuit board, and a plurality of light sources located on the light source circuit board. The plurality of light sources is electrically connected to the press part through the light source circuit board.

In some embodiments of the present disclosure, the main body includes a mounting part fixedly connected to an inner top wall of the accommodation space. The light-emitting module is fixedly connected to the inner top wall of the accommodation space through the mounting part.

The mounting part is configured to support the light-emitting module, so that a preset distance is provided between the light-emitting module and the inner top wall of the accommodation space.

In some embodiments of the present disclosure, the main body includes an upper cover and a lower cover, the accommodation space is formed in the lower cover, and the upper cover and the lower cover are detachably connected.

Along an axial direction of the main body, a lower surface of the upper cover is configured as an inner top wall of the accommodation space.

In some embodiments of the present disclosure, the main body further includes a first connection part, a second connection part and a connection piece. The first connection part is located on the upper cover, and the second connection part is located on the lower cover. The first connection part is detachably connected with the second connection part through the connection piece.

In some embodiments of the present disclosure, the light-emitting device further includes a seal part. The seal part is located between the upper cover and the lower cover, and the upper cover is connected to the lower cover through the seal part.

In some embodiments of the present disclosure, the main body further includes a first positioning part located on the upper cover, and a second positioning part located on the lower cover. The first positioning part and the second positioning part are plug-connected to each other.

In some embodiments of the present disclosure, the main body further includes a textured structure, and the textured structure is located on a surface of the upper cover from the lower cover.

In some embodiments of the present disclosure, the light-emitting device further includes a light-shielding layer, and the light-shielding layer is located on a surface of the lower cover away from the upper cover.

In some embodiments of the present disclosure, the light guide part is located on the lower cover, the light guide part is located between the upper cover and the lower cover, and a sidewall of the light guide part forms the light exist surface by means of laser engraving.

Other embodiments of the present disclosure will readily occur to those skilled in the art upon consideration of the present specification and practice of embodiments disclosed herein. The present application is intended to cover any variations, uses, or adaptations of the present disclosure that follow the general principle of the present disclosure and include common knowledge or techniques in the technical field not disclosed by the present disclosure. The specification and examples are to be regarded as exemplary only, with the true scope and spirit of the present disclosure being indicated by the following claims.

It should be understood that the present disclosure is not limited to the precise structures described above and shown in the accompanying drawings, and that various modifications and changes may be made without departing from the scope thereof. The scope of the present disclosure is limited only by the appended claims.

What is claimed is:

1. A light-emitting device, comprising:
a main body, comprising an accommodation space;
a light-emitting module, disposed in the accommodation space; and
a press part, located on the main body and configured to control on or off of the light-emitting module, wherein
the main body comprises a light guide, and light emitted by the light-emitting module is emitted outside of the main body through the light guide;
the light guide comprises a light exit surface and a light entrance surface;
the light entrance surface is located on a circumferential inner sidewall of the accommodation space, and the light exit surface is located on a circumferential outer sidewall of the main body, and the light emitted by the light-emitting module is emitted outside along a side of the main body;
the press part comprises a plurality of press regions, disposed at intervals on an axially outer sidewall of the main body; and
the plurality of press regions is configured to generate an elastic deformation along an axial direction of the main body under an effect of an external force.

2. The light-emitting device according to claim 1, wherein the press part comprises a plurality of groups of press protrusions, disposed in the accommodation space and fixedly connected to an inner top wall of the accommodation space, each of the plurality of press regions corresponding to a respective group of press protrusions; and at least one group of press protrusions comprises a plurality of press protrusions disposed around a center position of a respective press region, and the group of press protrusions is configured as a petal-shaped structure.

3. The light-emitting device according to claim 2, wherein the inner top wall of the accommodation space comprises a plurality of first mounting grooves, and each group of press protrusions is located in a respective first mounting groove.

4. The light-emitting device according to claim 1, wherein the press part comprises a plurality of arc-shaped bodies disposed in the accommodation space, each of the arc-shaped bodies corresponding to a respective press region; and an inner top wall of the accommodation space comprises a plurality of grooves, at least one groove being bent towards outside from a center position of the groove to form a respective arc-shaped body.

5. The light-emitting device according to claim 1, wherein the press part further comprises a press circuit board, disposed on an inner top wall of the accommodation space, covering the plurality of press regions, and electrically connected with the light-emitting module.

6. The light-emitting device according to claim 1, wherein the light-emitting module comprises a light source circuit board, and a plurality of light sources disposed on the light source circuit board, wherein the plurality of the light sources is electrically connected to the press part through the light source circuit board.

7. The light-emitting device according to claim 6, wherein the main body comprises a mounting part fixedly connected to an inner top wall of the accommodation space, wherein the light-emitting module is fixedly connected to the inner top wall of the accommodation space through the mounting part; and the mounting part is configured to support the light-emitting module, and a preset distance exists between the light-emitting module and the inner top wall of the accommodation space.

8. The light-emitting device according to claim 1, wherein the main body comprises an upper cover and a lower cover detachably connected to each other, the accommodation space is located in the lower cover; and along an axial direction of the main body, a lower surface of the upper cover is configured as an inner top wall of the accommodation space.

9. The light-emitting device according to claim 8, wherein the main body further comprises a first connection part, a second connection part and a connection piece, the first connection part is located on the upper cover, the second connection part is located on the lower cover, and the first connection part is detachably connected with the second connection part through the connection piece.

10. The light-emitting device according to claim 8, further comprising: a seal part located between the upper cover and the lower cover, wherein the upper cover is connected with the lower cover through the seal part.

11. The light-emitting device according to claim 8, wherein the main body further comprises a first positioning part located on the upper cover, and a second positioning part located on the lower cover, the first positioning part is plug-connected with the second positioning part.

12. The light-emitting device according to claim 8, wherein the main body further comprises a textured structure, disposed on a surface of the upper cover away from the lower cover.

13. The light-emitting device according to claim 8, further comprising: a light shielding layer, disposed on a surface of the lower cover away from the upper cover.

14. The light-emitting device according to claim 8, wherein the light guide is disposed on the lower cover, between the upper cover and the lower cover, and comprises a sidewall forming the light exit surface by laser engraving.

15. An audio device, comprising:
a device body; and
a light-emitting device, mounted on the device body, wherein
the light-emitting device comprises:
a main body, comprising an accommodation space;
a light-emitting module, disposed in the accommodation space; and
a press part, located on the main body and configured to control on or off of the light-emitting module, wherein
the main body comprises a light guide, and light emitted by the light-emitting module is emitted outside of the main body through the light guide;
the light guide comprises a light exit surface and a light entrance surface;
the light entrance surface is located on a circumferential inner sidewall of the accommodation space, and the light exit surface is located on a circumferential outer sidewall of the main body, and the light emitted by the light-emitting module is emitted outside along a side of the main body,
the press part comprises a plurality of press regions, disposed at intervals on an axially outer sidewall of the main body; and
the plurality of press regions is configured to generate an elastic deformation along an axial direction of the main body under an effect of an external force.

16. The audio device according to claim 15, wherein
the press part comprises a plurality of groups of press protrusions, disposed in the accommodation space and fixedly connected to an inner top wall of the accommodation space, each of plurality of the press regions corresponding to a respective group of press protrusions; and at least one group of press protrusions comprises a plurality of press protrusions disposed around a center position of a respective press region, and the group of press protrusions is configured as a petal-shaped structure.

17. The audio device according to claim 15, wherein
the light-emitting module comprises a light source circuit board, and a plurality of light sources disposed on the light source circuit board, wherein the plurality of the light sources is electrically connected to the press part through the light source circuit board.

18. The audio device according to claim 15, wherein
the main body comprises an upper cover and a lower cover detachably connected to each other, the accommodation space being located in the lower cover; and along an axial direction of the main body, a lower surface of the upper cover is configured as an inner top wall of the accommodation space.

\* \* \* \* \*